US007010122B2

(12) United States Patent
Stanford

(10) Patent No.: US 7,010,122 B2
(45) Date of Patent: Mar. 7, 2006

(54) NO RUB LATCH FOR AN ELECTRONIC DEVICE CRADLE

(75) Inventor: Robert N. Stanford, Flowery Branch, GA (US)

(73) Assignee: Motorola, Inc., Schaumburg, IL (US)

( * ) Notice: Subject to any disclaimer, the term of this patent is extended or adjusted under 35 U.S.C. 154(b) by 163 days.

(21) Appl. No.: 10/741,289

(22) Filed: Dec. 19, 2003

(65) Prior Publication Data

US 2005/0135603 A1   Jun. 23, 2005

(51) Int. Cl.
    *H04M 1/00*   (2006.01)
(52) U.S. Cl. ..................... 379/446; 379/455
(58) Field of Classification Search ............ 248/316.7, 248/316.6, 316.5, 316.4, 316.2, 316.1; 455/90.3; 379/446, 455, 454
See application file for complete search history.

(56) References Cited

U.S. PATENT DOCUMENTS 5,121,863 A * 6/1992 Kotitalo et al. ............. 379/446
5,457,745 A * 10/1995 Wang ........................ 379/454
5,828,750 A * 10/1998 Perala ....................... 379/446
6,185,302 B1 * 2/2001 Rytkonen et al. ........... 379/446
6,738,477 B1 * 5/2004 Kam ......................... 379/446
6,816,713 B1 * 11/2004 Chen ........................ 379/446
6,859,532 B1 * 2/2005 Tomura et al. ............. 379/446
6,944,294 B1 * 9/2005 Tsay ......................... 379/446

* cited by examiner

Primary Examiner—Jack Chiang
(74) Attorney, Agent, or Firm—Hisashi D. Watanabe

(57) ABSTRACT

A phone holder, or cradle, is provided having a latching mechanism that remains in an open position until a push button falls within a predetermined height of the cradle. Once this occurs, a hooked member is released from a stop coupled to a slide within the cradle, thereby allowing the hooked member to mate with a détente in an electronic device. In one embodiment, the latching mechanism includes a hooked member having a clasp, a slide, a push button with an inclined plane for actuating the slide and a plurality of springs. The latching mechanism prevents the clasp from riding along, and potentially marring, the surface of the electronic device.

16 Claims, 13 Drawing Sheets

NO RUB LATCH FOR AN ELECTRONIC DEVICE CRADLE

BACKGROUND

1. Technical Field

This invention relates generally to a cradle or holder for a portable electronic device, and more particularly to a cradle having a latch that clasps the electronic device without rubbing or scratching the electronic device.

2. Background Art

Portable electronic devices, like cellular telephones, are becoming more and more popular. It seems that everywhere you go, people are talking on cellular telephones. Once a luxury item, now they are nearly as common as wrist watches.

Most cellular telephones today come with some type of holder. The holder may be a belt holster, a desktop charger, or a vehicular charger. The holder generally includes some form of a pocket into which the phone may be inserted. A mechanical clasp then holds the phone in place. One such belt holster is shown in FIG. 1.

The most popular type of mechanical clasp is a cantilever arm. Using the phone holster 100 of FIG. 1 as an example, the cantilever arm 101 has a thumb grip 102 and a clasp 101. With this type of latch, one inserts a one end of a phone into the pocket 104. The person then presses the other end of the phone against the clasp 103, thereby causing the cantilever arm 101 to bend slightly. The clasp 103 then rides across the surface of the phone until it snaps into a notch in the phone. To remove the phone from the holster 100, one grasps the cantilever arm 101 at the thumb grip 102 and bends the arm 101 slightly. The clasp 103 then slides across the phone until the phone is released. The phone can then be removed from the pocket 104.

The problem with this cantilever arm type latch is that the clasp rides along the surface of the phone. Today's phones are not only portable communication devices, but fashion statements as well. Manufacturers are making flashy new phones with colored surfaces. These surfaces may be either painted or plated. In either case, when a clasp rides along the surface of the phone, it will generally scratch and mar the surface.

There is thus a need for an improved phone holder with a clasp that will not scratch the finish of the phone.

DETAILED DESCRIPTION OF THE INVENTION

Figure 1:
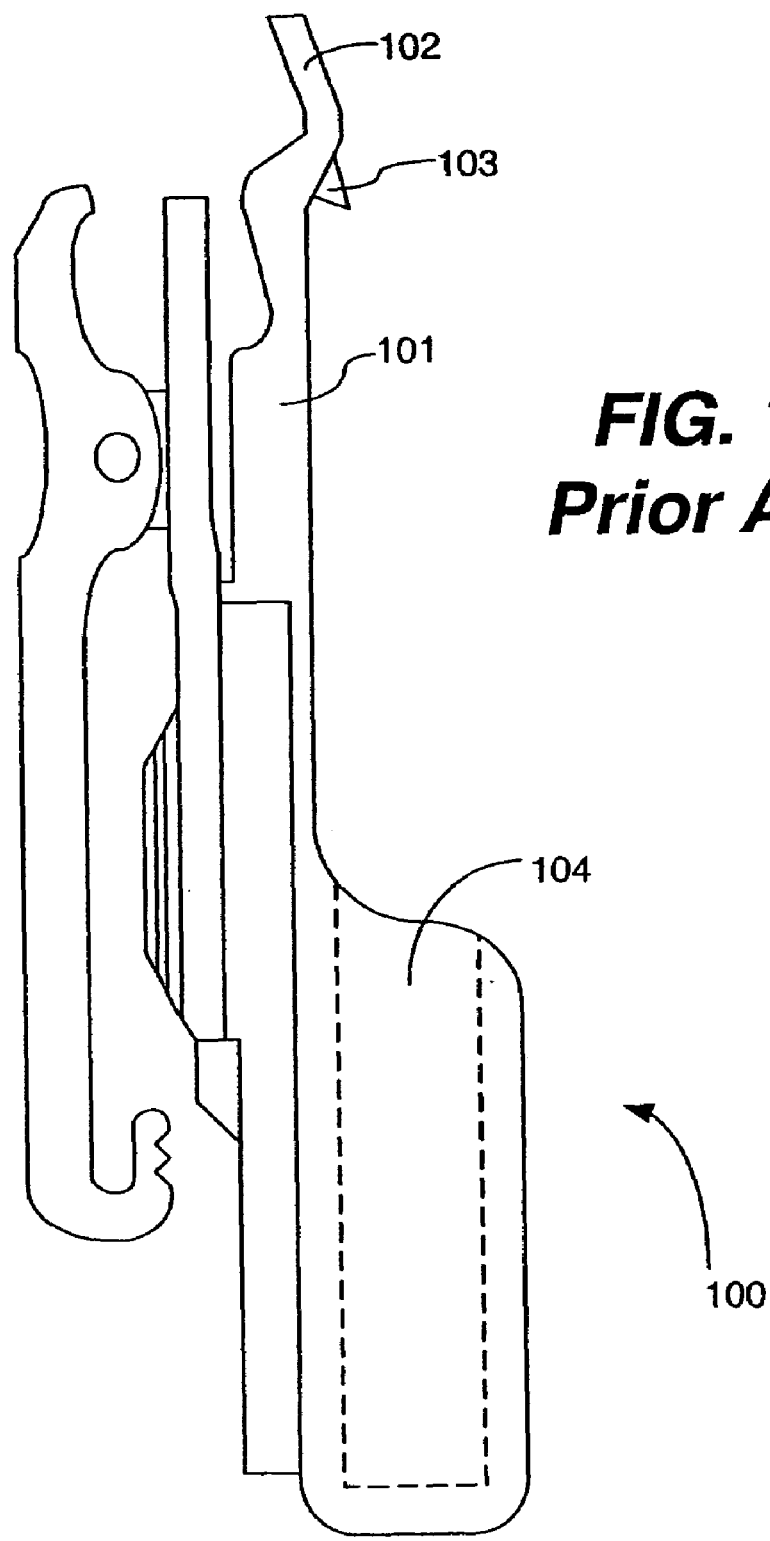
FIG. 1 illustrates a prior art phone holder.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a holder, or cradle, for a portable device, like a cellular telephone for example. The cradle has a latch that does not engage until the device is essentially seated in the cradle. In other words, the latch does not engage until the device is in a position where the latch will engage without scratching the device's surface. The latch also allows a user to insert the phone into the cradle with one hand, in that the latch will automatically activate upon insertion. The latch also allows the user to eject the phone with the touch of a button.

Figure 2:
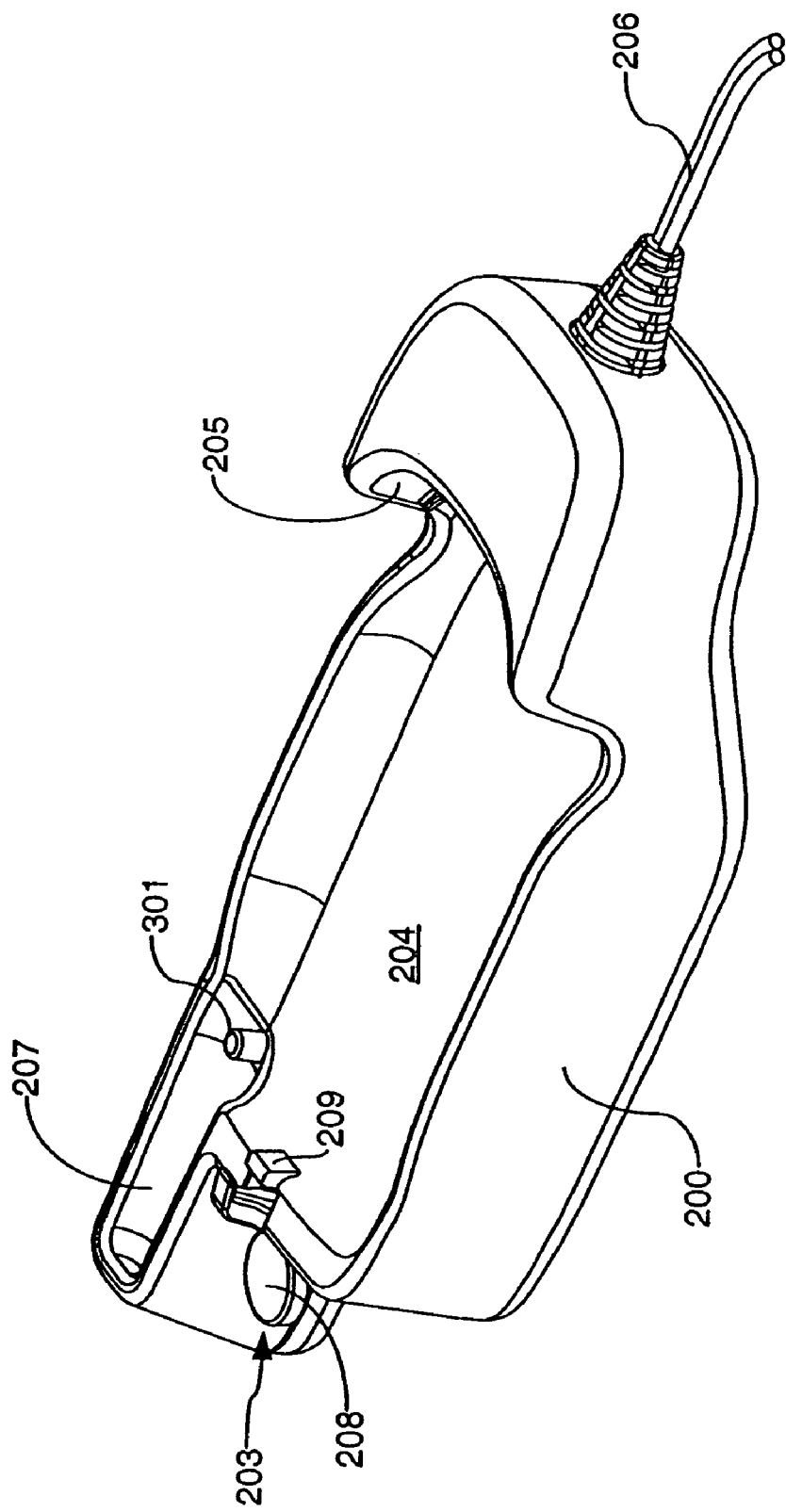
FIG. 2 illustrates a cradle in accordance with the invention.

Turning now to FIG. 2, illustrated therein is a cradle 200 with a latch in accordance with the invention. For simplicity of discussion, the term cradle will be used to refer to the device that holds the phone. The exemplary cradle shown in the figures is a vehicular cradle, although the invention is not so limited. Other holders, including desktop chargers and belt holsters, could equally be substituted for the vehicular cradle. Additionally, for simplicity of discussion, a phone will be used as the exemplary electronic device. It will be clear to those of ordinary skill who have the benefit of this disclosure that the invention could be applied to numerous electronic devices, including pagers, PDAs, two-way radios and the like.

The cradle 200 includes an electronic device recess 204, into which an electronic device may be inserted. The electronic device recess 204 terminates at one end of the cradle 200 into an electronic device foot recess 205, into which an electronic device may be inserted. The electronic device foot recess 205 may include electrical contacts through which power and data may be transmitted to and from the electronic device. Where the cradle 200 includes electronics, for example in a vehicle, a cord 206 may be coupled through which power may be transmitted.

As many electronic devices have custom form factors, any number of recesses may be disposed within the electronic device recess 204 as needed. For example, where the electronic device is a phone having an antenna protruding from the rear of the phone, an antenna recess 207 may be included to accommodate the antenna.

As stated above, the cradle 200 includes a latch mechanism that allows the electronic device to be inserted without being scratched. The visible components of the latch shown in FIG. 2 include a push button 301, a hooked member 203 and a loading plate 208. A standoff rib 209 provides a means of retaining the electronic device in the cradle 200, thereby preventing the electronic device from sliding laterally.

In its normal mode of operation, when an electronic device is inserted into the electronic device recess 204, the hooked member 203 engages the electronic device. The hooked member 203 is actuated by the push button 301, as will be described in detail below. As it is desirable for the hooked member 203 not to engage until the electronic device is basically fully seated in the electronic device recess 204 (so as to avoid marring the electronic device), there is a maximum predetermined height above the electronic device recess 204 for the push button 301 to actuate the hooked member 203. In other words, so long as any part of the push button 301 is above this predetermined height, relative to the recess from which the push button 301 protrudes, the hooked member 203 should not actuate. However, once the push button 301 passes below this predetermined height, the hooked member 203 engages. In one preferred embodiment, this predetermined height is 1 mm.

Figure 3:
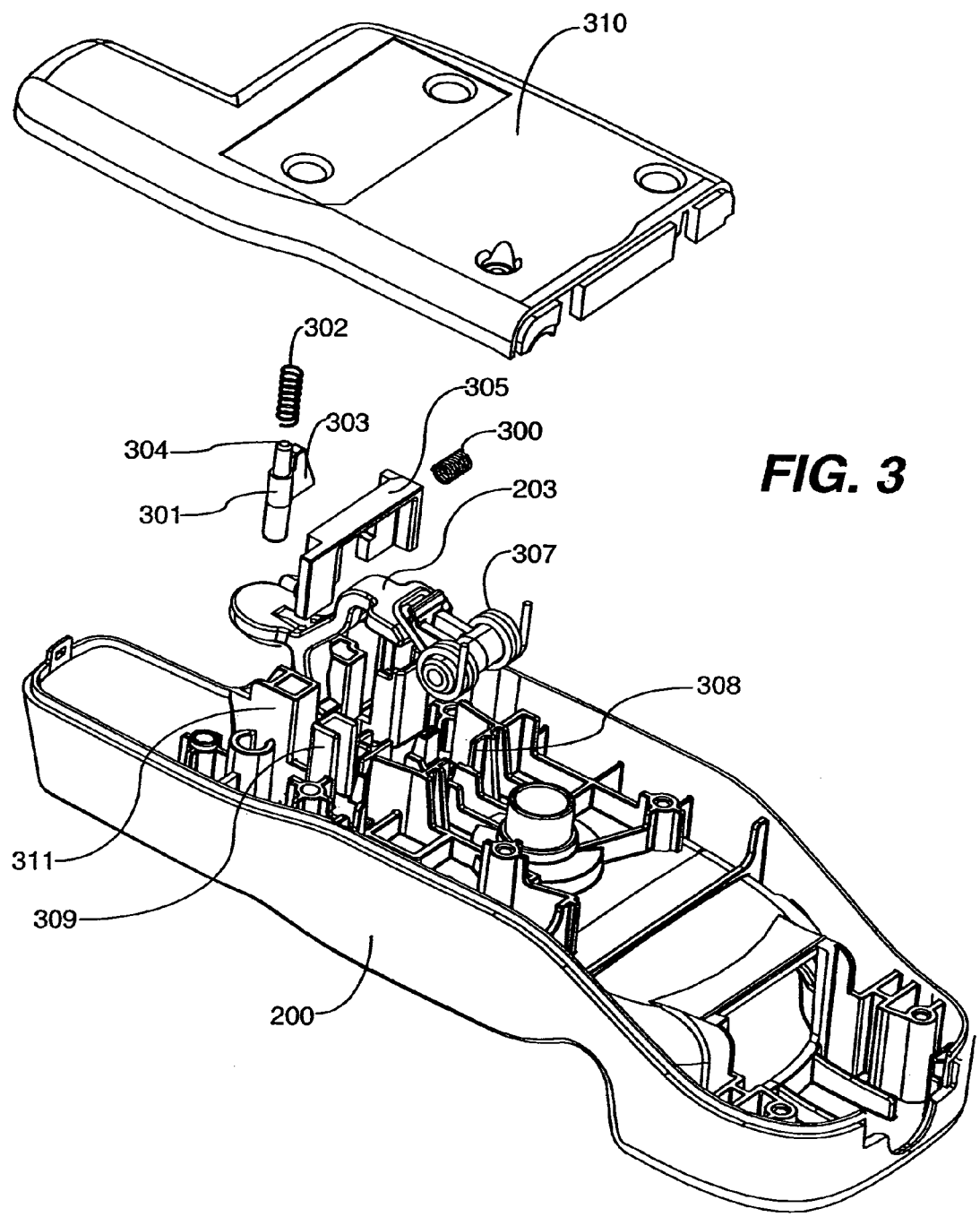
FIG. 3 illustrates an exploded view of a cradle having a no rub latch in accordance with the invention.

Referring now to FIG. 3, illustrated therein is an exploded view of a cradle 200 having a latch in accordance with the invention. The interior of the cradle 200 is exposed, as the rear cradle housing 310 has been removed. The cradle 200 and the rear cradle housing 310 are preferably manufactured from a rigid plastic like polycarbonate, ABS, or polycarbonate-ABS by way of an injection molding process.

The latching mechanism comprises the hooked member 203, which is inserted into the cradle 200. The hooked member 203 includes a torsion spring 307 disposed about the hooked member 203. The torsion spring 307 provides a rotational force to the hooked member 203. The torsion spring 307 seats against spring extension stops 308 disposed in the cradle 200.

The hooked member 203 is retained within the housing by way of a slide 305. The slide 305 seats about the hooked member 203 and rests against slide plate stops 309,311 disposed within the cradle 200. The slide 305 is primarily actuated by the push button 301, a slide spring 300 provides a return force to the slide 305.

The push button 301 sits atop the slide 305. The push button 301 includes a slide actuation plane 303 extending therefrom. The slide actuation plane 303 operates against a post on the slide 305 to actuate it, as will be explained in more detail below. Additionally, the push button 301 includes a push button spring boss 304, about which a push button spring 302 sits. The push button spring 302 provides a return force to the push button 301.

Figure 4:
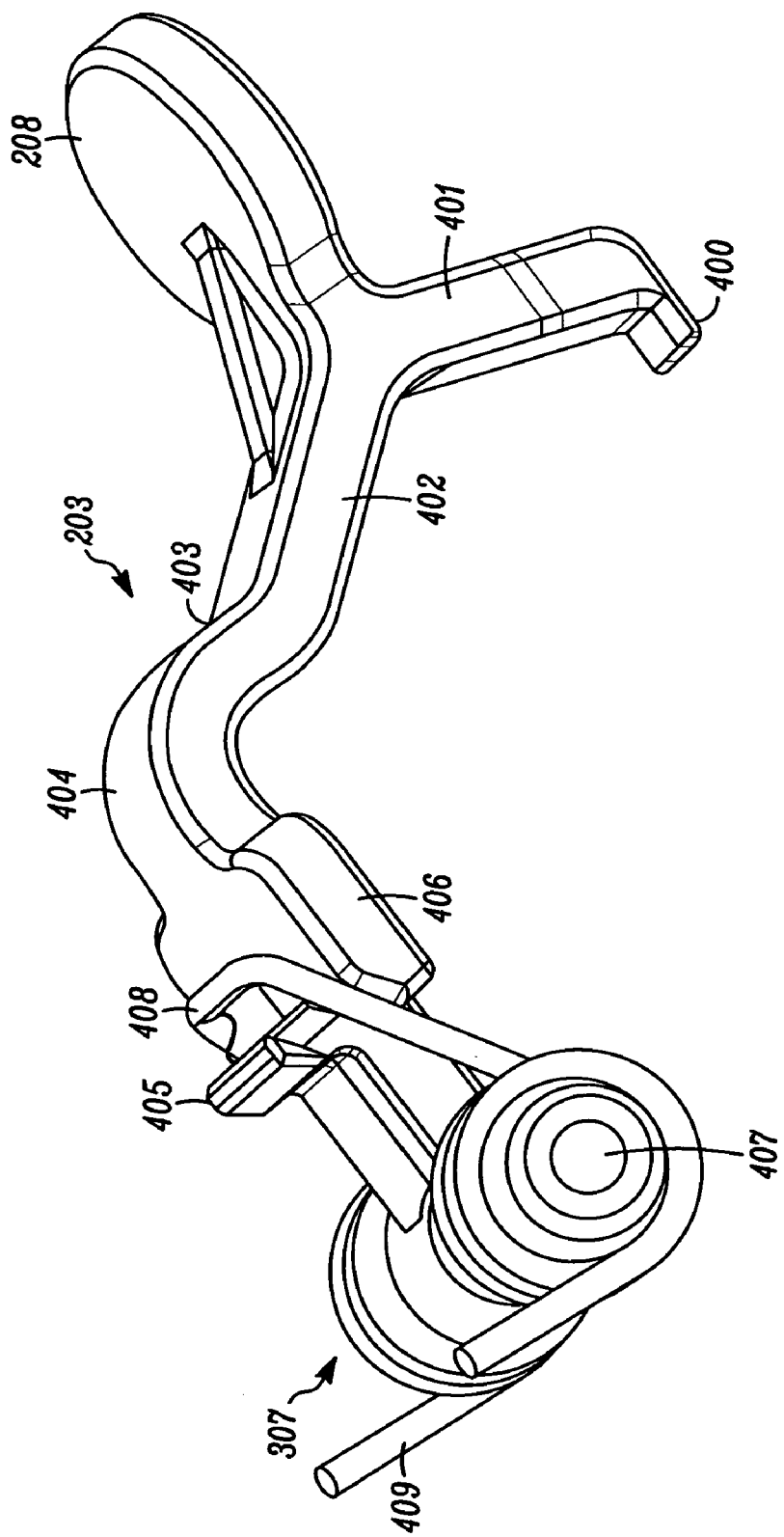
FIG. 4 illustrates a perspective view of a hooked member in accordance with the invention.

Referring now to FIG. 4, illustrated therein is an enlarged, perspective view of the hooked member 203. The hooked member 203 may include many mechanical features, as the application warrants. In this preferred embodiment, the hooked member 203 includes a clasp 400 for coupling to a clasp détente disposed upon the electronic device. The clasp 400 is supported by a clasp arm 401 that extends from the hooked member 203.

The loading plate 208 serves as a planar member upon which a user may apply force. The loading plate 208 is designed to be easily operated by a finger or thumb. The loading plate 208 is supported by the loading plate arm 402.

The hooked member 203 may include certain curvatures, depending upon the application. For example, in applications where space within the cradle 200 is limited, the hooked member 203 may have several curves so as to navigate the nooks and crannies of the cradle 200 without interfering with cradle components.

Two exemplary curvatures are shown in this particular embodiment. The first is the housing recess 403, which is a concave curvature allowing the aperture in the cradle 200 through which the hooked member 203 passes to be smaller. A second curvature is the slide director 404, which applies force to the slide 305 as will be described below. The slide director 404 is a convex curvature about which the slide 305 slides.

A mechanical stop 406 is also provided. The mechanical stop 406 performs several functions. One of these functions is ensuring that the hooked member 203 does not overextend through the cradle 200. A second function is ensuring that the slide 305 stays in the proper position relative to the hooked member 203.

As mentioned above, a torsion spring 307 is disposed about the hooked member 203. The torsion spring 307 is preferably seated about a spring arm 407 that extends from the hooked member 203. Where, as in this embodiment, the torsion spring 307 includes multiple coils, multiple spring arms 407 may be provided.

The torsion spring 307 includes a means of applying force to the hooked member 203. In this exemplary embodiment, the torsion spring 307 includes a spring loop 408 to act upon the hooked member 203. A spring stop 405 ensures that the spring loop 408 stays securely coupled to the hooked member 203. The torsion spring 203 also includes spring extensions 409, which operate against the spring extension stops 308.

Figure 5:
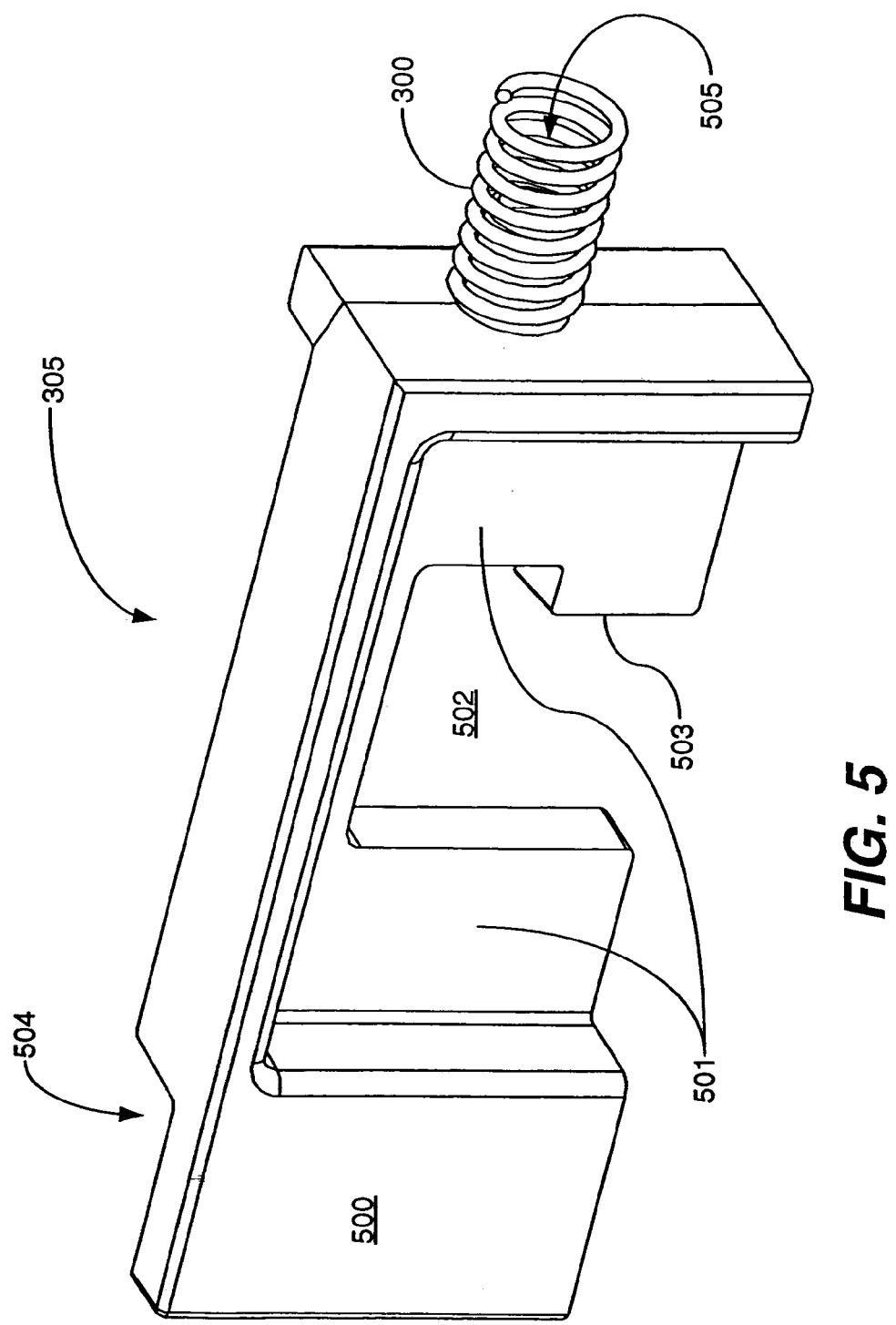
FIG. 5 illustrates a perspective view of a slide in accordance with the invention.

Referring now to FIG. 5, illustrated therein is an enlarged, perspective view of the slide 305. The slide 305 includes a slide spring boss 505, about which the slide spring 300 is disposed. The slide 305 includes a mechanical stop détente 501, in which the mechanical stop 406 sits. Recall from above that one of the functions of the mechanical stop 406 is to ensure that the slide 305 stays in proper alignment relative to the slide 305. This is done by way of the mechanical stop détente 501, as the slide 305 rides along the mechanical stop 406, thereby keeping it properly aligned.

A hooked member aperture 502 is disposed within the slide 305. The hooked member 203 is positioned within the hooked member aperture 502, preferably such that a cross section of the slide director 404 is coplanar with the slide 305.

A hooked member stop 503 protrudes from the hooked member aperture 502. The hooked member stop 503 is the feature that locks the hooked member 203 in the open position when no electronic device is seated in the cradle 200. This will be explained in further detail with respect to FIG. 6. The slide 305 includes a push button détente 504 atop which the push button 301 is positioned.

Figure 6:
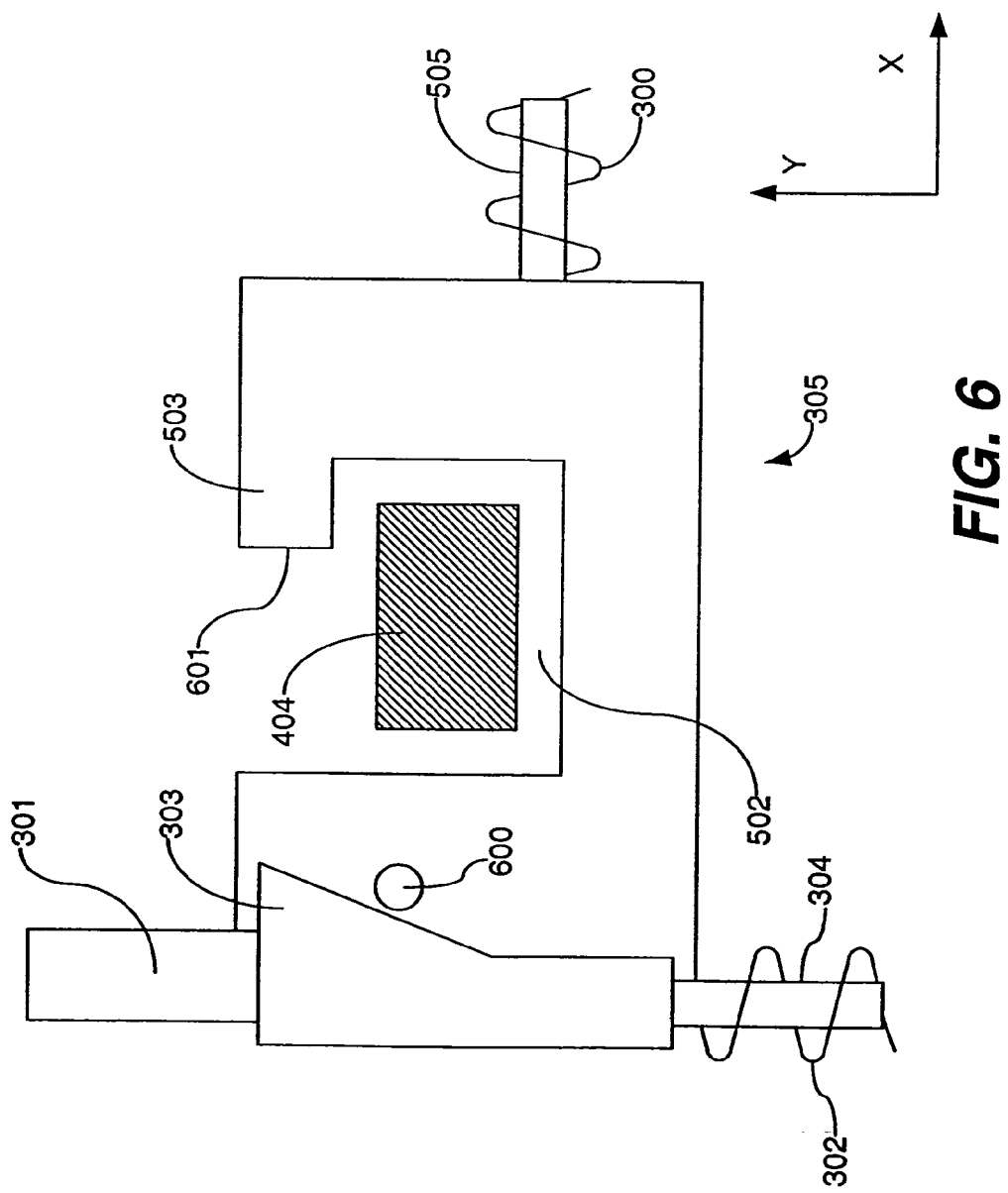
FIG. 6 illustrates a plan view of a latching mechanism in accordance with the invention.

Referring now to FIG. 6, illustrated therein is a top, plan view of the latch components. A cross section of the slide director 404 is shown positioned within the hooked member aperture 502 of the slide 305. The push button 301, with its slide actuation plane 303, is positioned atop the slide 305 with the slide actuation plane adjacent to the push button boss 600 coupled to the slide 305. The push button-spring 302 is positioned upon the push button spring boss 304. Likewise, the slide spring 300 is positioned atop the slide spring boss 505.

The operation of the latch mechanism occurs as follows: FIG. 6 illustrates a state in which the hooked member 203 is in the open position with respect to the cradle 200, as the slide director 404 is latched behind the hooked member stop 503. This is the state where no electronic device is present in the cradle 200.

When an electronic device is inserted in the cradle, recall from FIG. 2, that either the electronic device or a feature extending from the electronic device, like the antenna, pushes the push button 301 into the cradle 200. When this occurs, the slide actuation plane 303 operates on the push button boss 600, thereby causing the slide 305 to move in the X direction. In other words, when the push button 301 is actuated, the slide actuation plane 303 applies a force to the push button boss 600, thereby causing the slide 305 to move.

Once the slide 305 has moved a predetermined amount, the hooked member stop 503 passes beyond the slide director 404, thereby allowing the slide director 404, and thus the hooked member 203, to pass about the hooked member stop 503 and out of the hooked member aperture 502 (recall that the torsion spring causes the hooked member 203 to move). Note that the amount of push button 301 displacement required to free the slide director 404 is determined by both the angle of the slide actuation plane 303 relative to the push button 301, and the position of the push button boss 600 relative to the slide 305 and the slide actuation plane 303. As such, the latching mechanism may be customized to accommodate electronic devices with different shapes or thicknesses.

Note also that the length of the hooked member stop 503 may be altered as well to adjust the release of the hooked member 203 from the hooked member aperture 502. The width of the hooked member stop 503 may be adjusted to alter the angle of the hooked member 203 in its open position.

When the slide director 404 passes out of the hooked member aperture 502, the clasp 400 is able to engage with the electronic device in a snapping motion. When the predetermined height associated with the push button is calculated properly, this snapping motion occurs such that the clasp engages the electronic device at just the right moment so as to avoid scratching or marring the surface of the electronic device.

When the slide director 404 passes out of the hooked member aperture 502, the slide director 404 holds the slide 305 in an open position by resting against the outer edge 601 of the hooked member stop 404. The latching mechanism is returned to the state shown in FIG. 6 when a user exerts force against the load plate 208. This causes the slide director 404 to move back into the hooked member aperture 502. This movement allows the loaded slide spring 300 to move the slide 305 in the negative X direction, as well as allowing the loaded push button spring 302 to move the push button 301 in the Y direction. When the push button 301 moves in the Y direction, it helps to eject the electronic device from the electronic device recess 204 in the cradle 200.

Figure 7:
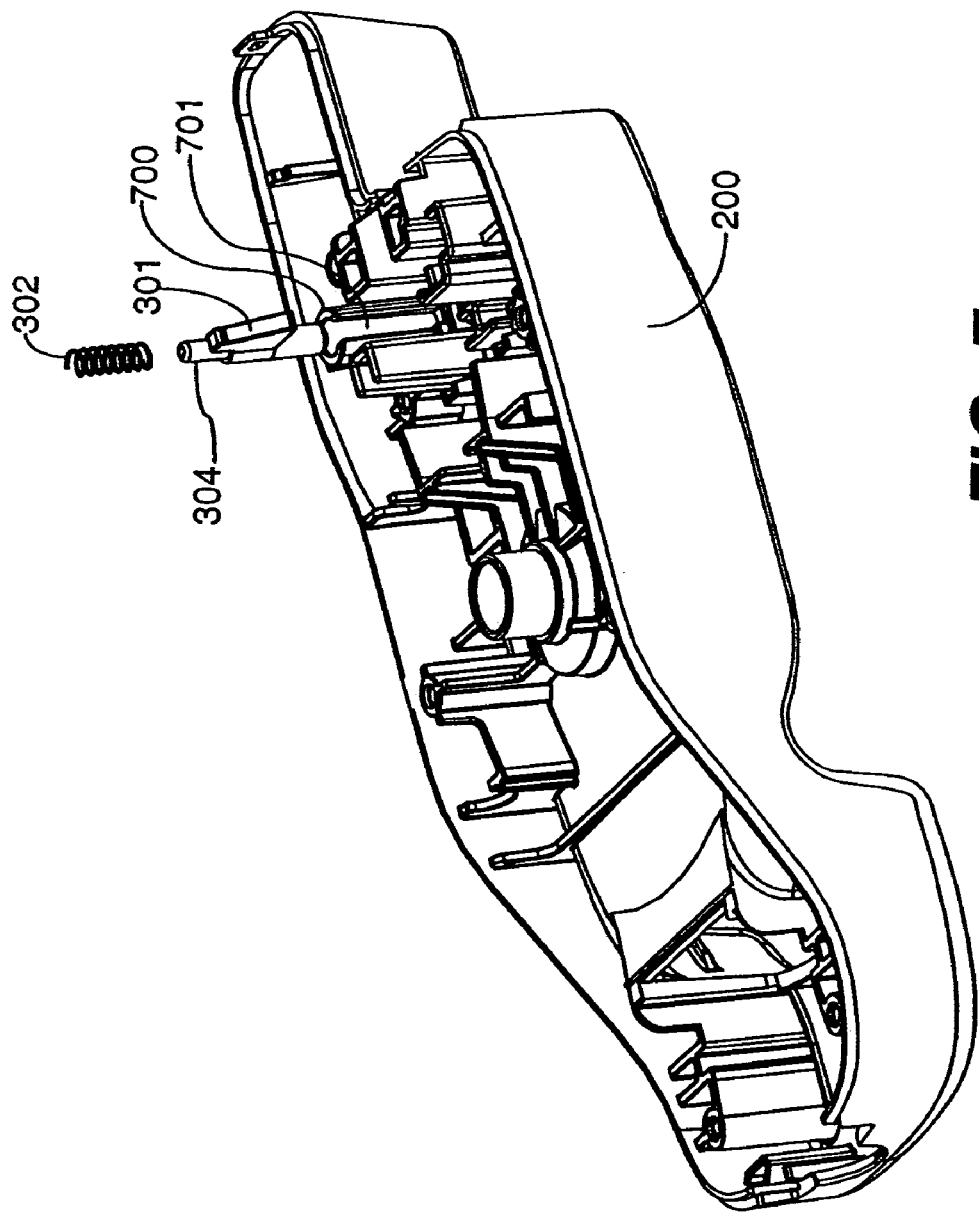
FIG. 7 illustrates an exploded view of cradle and latch components in accordance with the invention.

Referring to FIGS. 7–10, the assembly of the latching mechanism will be described. Referring first to FIG. 7, illustrate therein is a perspective view of the cradle 200. Disposed within the cradle 200 is a push button boss 700. The push button boss 700 has a slide actuation plane slot 701 that runs along the side of the push button boss 700. The push button 301 is inserted into the push button boss 700 such that the top of the push button 301 extends through the cradle 200. The push button spring 302 is then positioned upon the push button spring boss 304.

Figure 8:
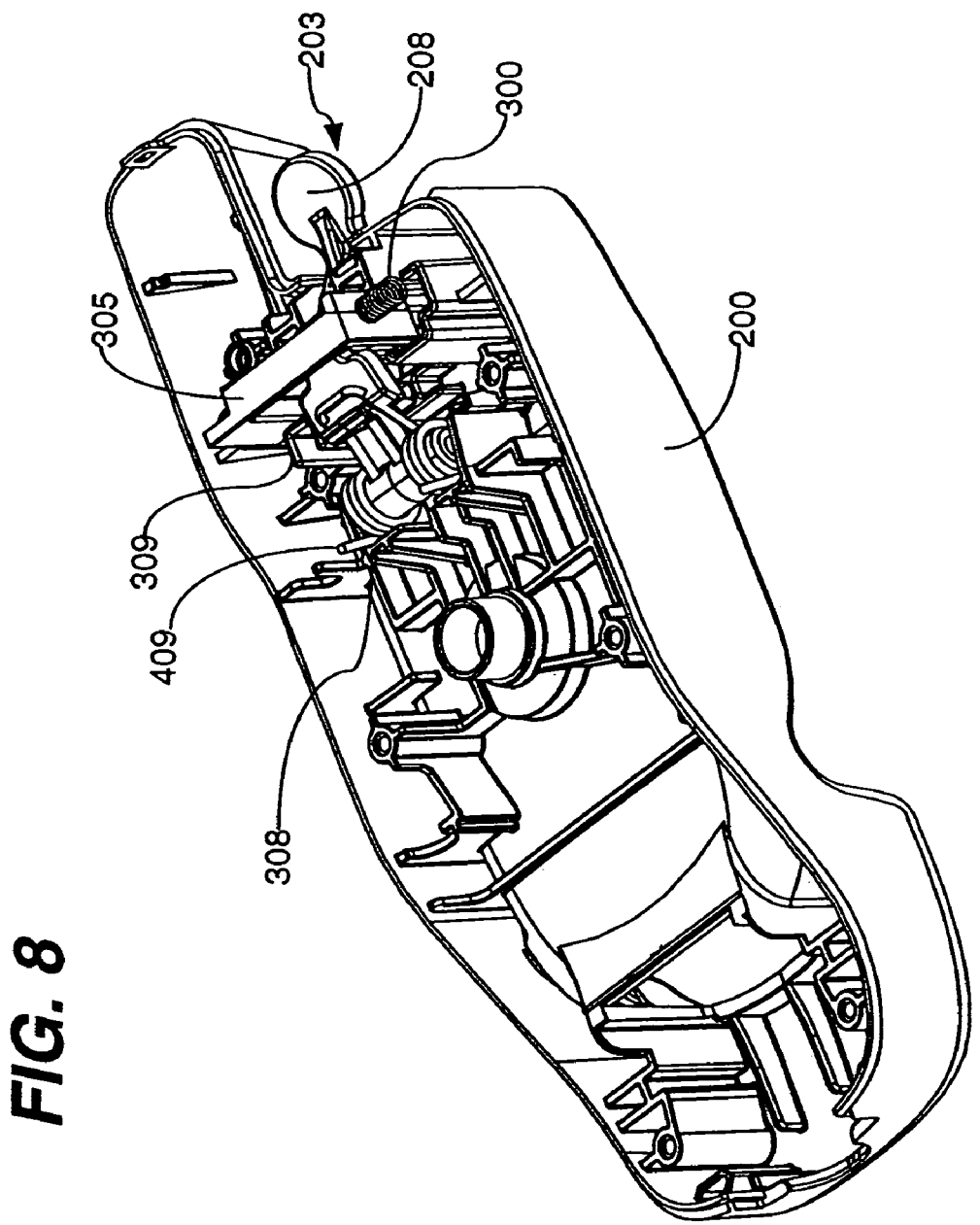
FIG. 8 illustrates an exploded view of cradle and latch components in accordance with the invention.

Turning to FIG. 8, the hooked member 203, with the torsion spring attached, is then inserted into the cradle 200 such that the loading plate 208 is exposed outside the cradle 200. Upon insertion of the hooked member 203, the spring extensions 409 rest against the spring extension stops 308.

The slide spring 300 is then positioned about the slide spring boss and compressed. The slide 305 is then positioned about the hooked member 203 such that the slide 305 rests against the slide plate stop 309.

Figure 9:
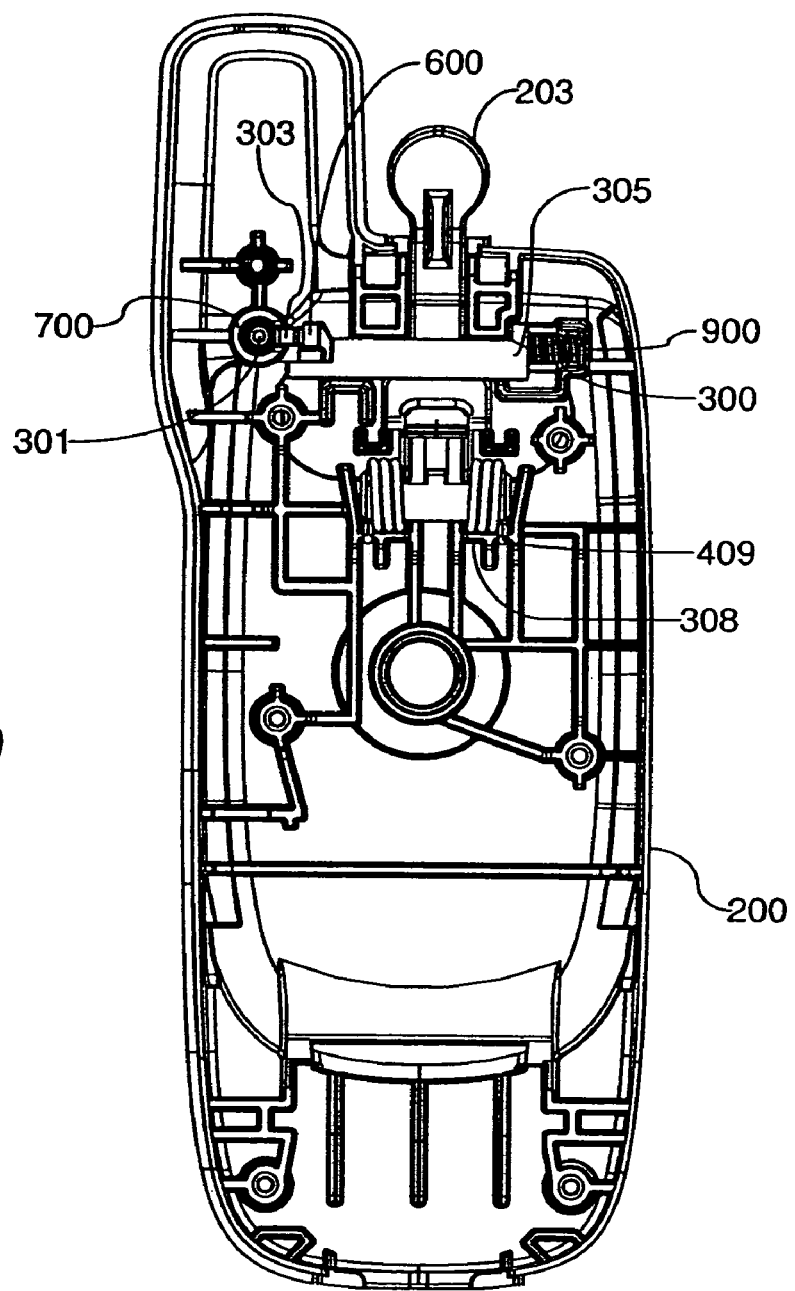
FIG. 9 illustrates a plan view of cradle and latch components in accordance with the invention.
Figure 10:
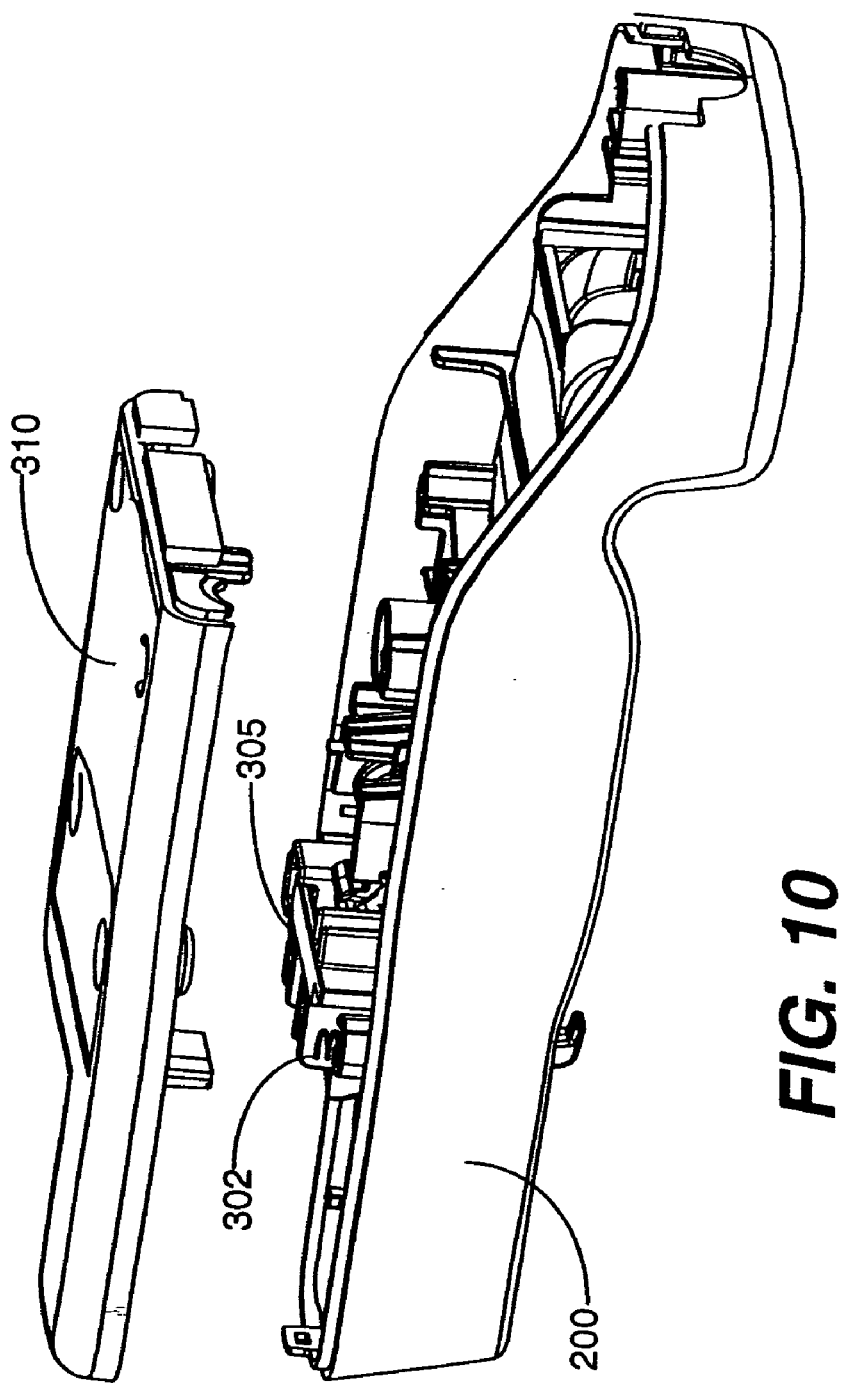
FIG. 10 illustrates an exploded view of cradle components in accordance with the invention.

FIG. 9 illustrates a top view of the assembly. Note that the slide spring 300 is compressed against a slide spring stop 900. The slide 305 is positioned about the hooked member 203. The hooked member 203 is seated in the cradle 200 such that the spring extensions 409 rest against the spring extension stops 308. The push button boss 600 is positioned against the slide actuation plane 303, such that when the push button 301 is actuated within the push button boss 700, the slide 305 will move laterally. FIG. 10 completes the assembly, when the rear cradle housing 310 is coupled to the cradle 200, thereby providing a backstop for both the slide 305 and the push button spring 302. It is often preferable to add a plurality of small ribs to the inside of the rear cradle housing to facilitate efficient lateral translation of the slide 305, i.e., to prevent the slide 305 from rubbing against a flat surface of the rear cradle housing 310.

Figure 11:
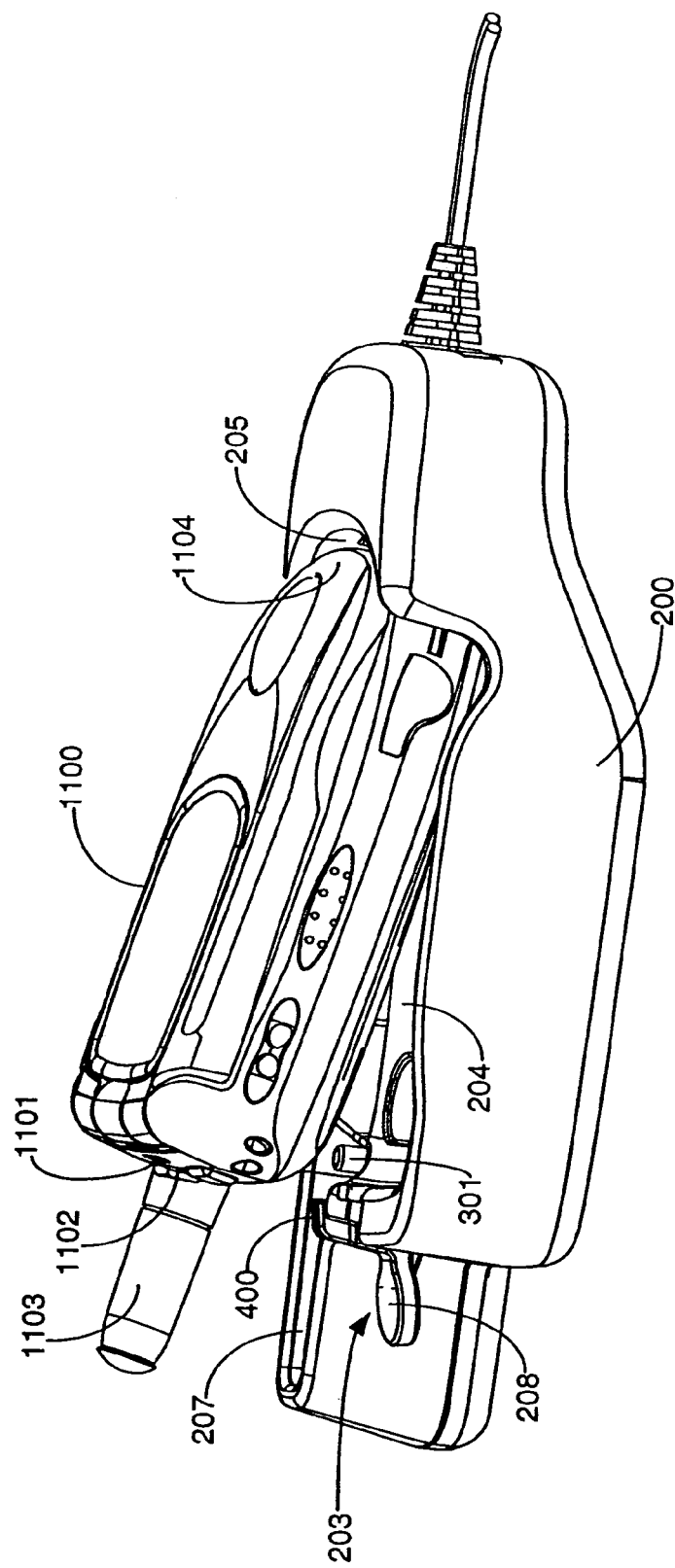
FIG. 11 illustrates a perspective view of an electronic device being inserted in to a cradle having a no rub latch in accordance with the invention.

Referring now to FIG. 11, illustrated therein is a perspective view of an electronic device 1100 being inserted into a cradle 200 with a no rub latch in accordance with the invention. As shown, the hooked member 203 is in the open position, as force was applied at some past time to the loading plate 208, causing the slide director 404 to latch behind the hooked member stop 503, both of which are disposed within the cradle 200. As such, the clasp 400 is in the retracted position, so as not to interfere with the electronic device 1100. The push button 301 has been fully extended by the push button spring 302.

To couple the electronic device 1100 to the cradle 200, the electronic device foot 1104 is first inserted in to the electronic device foot recess 205. The electronic device 1100 may then be rotated into the electronic device recess 204. As this occurs, the antenna 1103 will begin to depress the push button 301.

Note that the electronic device 1100 includes a clasp détente 1101 into which the clasp 400 will ultimately couple. Adjacent to the clasp détente 1101, there is a no-rub surface upon which the clasp 400 should not interfere. So long as the clasp 400 remains in the retracted position, no interference will occur.

As soon as the push button 301 falls within a predetermined height, like 1 mm, of the electronic device recess 204 or the antenna recess 207, whichever it protrudes through, the slide actuation plane 303 will actuate the slide 305, thereby allowing the hooked member 203 to snap shut. The clasp 400 will engage the electronic device precisely at the clasp détente 1101. This occurs when the electronic device 1100 is properly seated with in the cradle 200. To remove the electronic device 1100 from the cradle 200, a user simply needs to apply finger pressure to the load plate 208.

To restate, when the hooked member 203 is latched behind the hooked member stop 503, and the electronic device 1100 is inserted into the electronic device recess 204, the hooked member 203 becomes unlatched from the hooked member stop 503 when the push button 301 is within a predetermined height of the electronic device recess 204, or the antenna recess 207, disposed within the cradle 200.

One may note that it is possible to press the push button 301 with something other than the electronic device 1100. For example, one may inadvertently press the push button 203 with a finger or other object prior to inserting the electronic device 1100 into the cradle. As such, the hooked member 203 will snap closed, potentially causing the clasp 400 to interfere with the electronic device 1100. A user may rectify such a situation by simply applying pressure to the load plate 208, thereby resetting the hooked member 203 by latching the hooked member 203 behind the hooked member stop 601.

Figure 12:
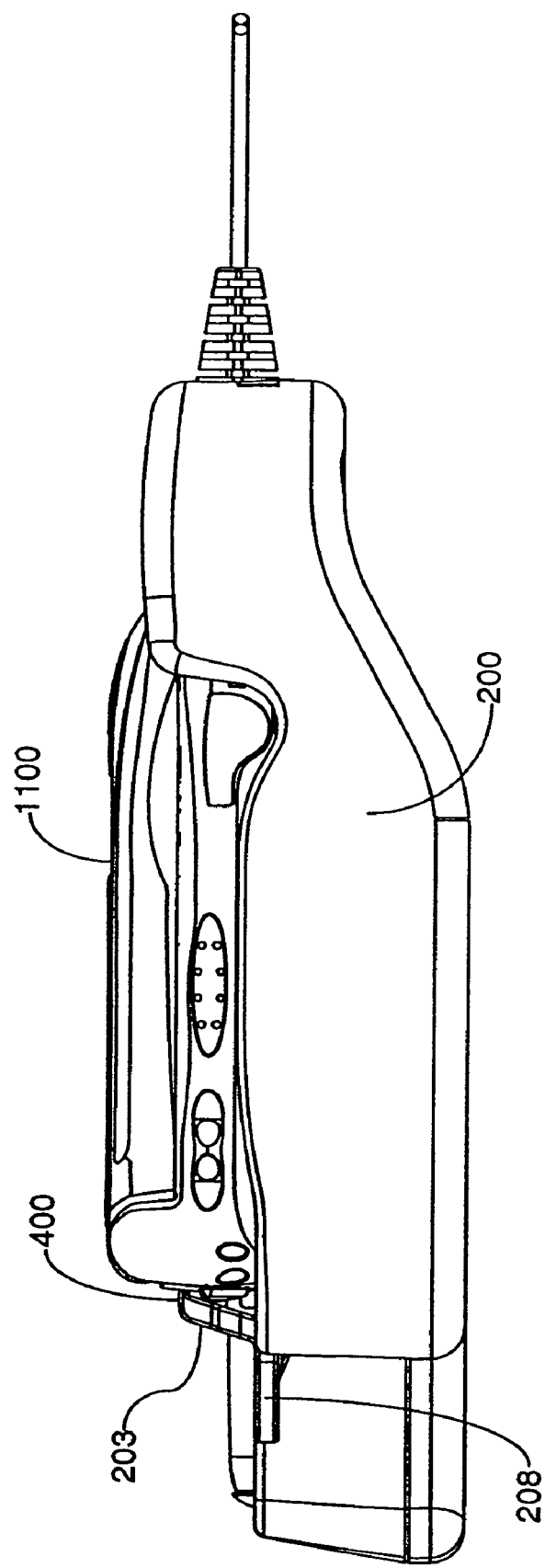
FIG. 12 illustrates a perspective view of an electronic device after insertion in to a cradle having a no rub latch in accordance with the invention.
Figure 13:
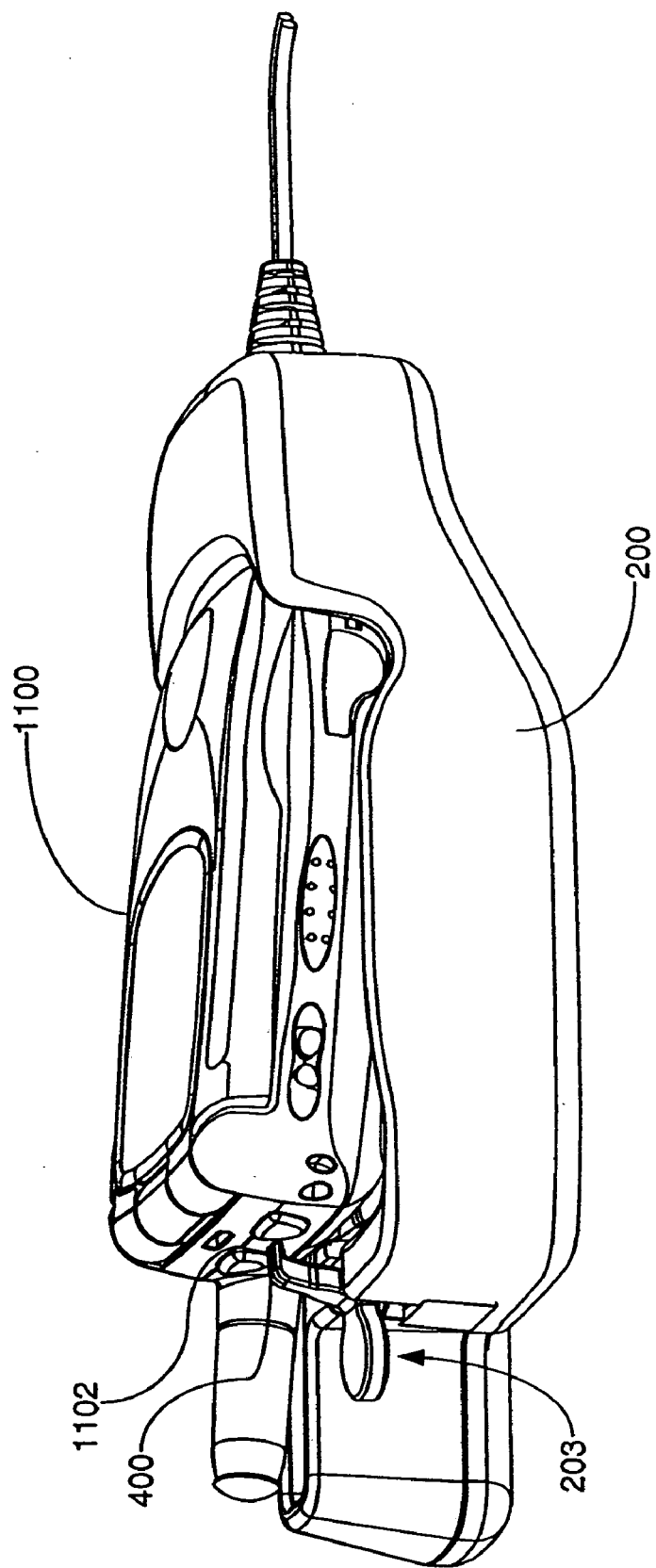
FIG. 13 illustrates an error mode of operation for a cradle having a no rub latch in accordance with the invention.

However, one may inadvertently forget to do this. Or, in haste, may unknowingly insert the electronic device 1100 into the cradle 200 with the hooked member 203 closed. The invention provides for such an event by allowing for an error mode of operation. Referring now ti FIG. 12, illustrated therein is the error mode of operation. As the hooked member 203 is held in a closed position by the coil spring 307 (not shown here), when the electronic device is inserted, the coil spring 307 will give, allowing the hooked member 203 to slide across the no rub area 1102. While the electronic device 1100 may be marred in this error mode, it is preferable to not being able to insert the electronic device 1100 into the cradle 200 at all. To restate, when the hooked member 203 is not latched behind the hooked member stop 503, the insertion of the electronic device 1100 causes the torsion spring 307 to actuate, thereby allowing the clasp 400 to slide across the no rub surface 1102 of the electronic device 1100.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a phone has been used herein as an exemplary electronic device other devices, like PDAs, two-way radios and pagers, may also be substituted.

What is claimed is:

1. A latch for coupling a portable electronic device to a cradle, comprising:
   a. a hooked member, the hooked member comprising:
      i. at least one clasp;
      ii. at least one clasp arm;
      iii. at least one loading plate; and
      iv. at least one spring arm;
   b. a torsion spring coupled to the hooked member about the at least one spring arm;
   c. a slide, the slide comprising:
      i. a push button boss;
      ii. a hooked member aperture; and
      iii. a hooked member stop;
   d. a push button, the push button comprising a slide actuation plane extending therefrom;
   wherein when the push button is actuated, the slide actuation plane applies a force to the push button boss, thereby causing the slide to move, thereby allowing the hooked member to pass about the hooked member stop.

2. The latch of claim 1, wherein the hooked member further comprises:
   a. at least one loading plate;
   b. at least one loading plate arm coupled to the at least one loading plate; and
   c. at least one mechanical stop.

3. The latch of claim 2, wherein the hooked member further comprises:
   a. a housing recess;
   b. a slide director; and
   c. a spring stop.

4. The latch of claim 1, wherein the slide further comprises:
   a. a slide plate;
   b. a mechanical stop détente; and
   c. a slide spring boss.

5. The latch of claim 4, further comprising a slide spring disposed about the slide spring boss.

6. The latch of claim 1, wherein the push button further comprises:
   a. a push button spring boss; and
   b. a push button spring disposed about the push button spring boss.

7. The latch of claim 1, wherein the torsion spring comprises:
   a. a spring loop;
   b. at least one coil; and
   c. at least one spring extension.

8. A cradle comprising a latch, wherein the latch is selected from the group consisting of the latch of claim 1, the latch of claim 2, the latch of claim 3, the latch of claim 4, the latch of claim 5, the latch of claim 6, and the latch of claim 7.

9. The cradle of claim 8, further comprising:
   a. an electronic device recess;
   b. and an electronic device foot recess.

10. The cradle of claim 9, further comprising:
    a. at least one spring extension stop;
    b. a slide plate stop; and
    c. a push-button boss.

11. The cradle of claim 10, wherein the push button boss comprises a slide actuation plane slot.

12. The cradle of claim 8, wherein when the hooked member is latched behind the hooked member stop and an electronic device is inserted into the electronic device recess, the hooked member becomes unlatched from the hooked member stop when the push button is within a predetermined height of an electronic device recess disposed within the cradle.

13. The cradle of claim 12, wherein the predetermined height is less than 1 mm.

14. The cradle of claim 8, wherein when the hooked member is not latched behind the hooked member stop, insertion of an electronic device causes the torsion spring to actuate, thereby allowing the clasp to slide across a no rub surface of the electronic device.

15. The cradle of claim 8, wherein the hooked member may be latched behind the hooked member stop by applying force to the loading plate.

16. The cradle of claim 15, wherein when force is applied to the loading plate, a push button boss allows the slide actuation plane to pass thereby.

* * * * *